(12) United States Patent
Liao et al.

(10) Patent No.: US 7,724,766 B2
(45) Date of Patent: May 25, 2010

(54) HIGH-DENSITY WIRELESS LOCAL AREA NETWORK

(75) Inventors: Raymond Liao, Pleasanton, CA (US); Raghuveer Chereddy, Fremont, CA (US); Joerg Mueller, Linkenheim (DE); Stefan Keller, Karlsruhe (DE); Kai Benjamins, Karlsruhe (DE); Christoph Weiler, Bretten (DE)

(73) Assignee: Siemens Aktiengesellschaft, Munich ( * ) Notice: Subject to any disclaimer, the term of this patent is extended or adjusted under 35 U.S.C. 154(b) by 1047 days.

(21) Appl. No.: 11/097,759

(22) Filed: Mar. 31, 2005

(65) Prior Publication Data

US 2006/0221993 A1    Oct. 5, 2006

(51) Int. Cl.
*H04L 12/413* (2006.01)
*H04B 7/00* (2006.01)
*H04W 4/00* (2009.01)

(52) U.S. Cl. ............... 370/449; 370/328; 370/338; 370/445; 455/519

(58) Field of Classification Search ............... 370/311, 370/328–389, 401, 346–352, 436–449; 455/343–519
See application file for complete search history.

(56) References Cited

U.S. PATENT DOCUMENTS

| | | | | |
|---|---|---|---|---|
| 5,297,144 A * | 3/1994 | Gilbert et al. | ............ | 370/346 |
| 6,067,297 A * | 5/2000 | Beach | ............ | 370/389 |
| 6,243,373 B1 * | 6/2001 | Turock | ............ | 370/352 |
| 7,382,757 B2 * | 6/2008 | LoGalbo et al. | ............ | 370/338 |
| 7,433,669 B2 * | 10/2008 | Rue | ............ | 455/343.2 |
| 7,468,976 B2 * | 12/2008 | Wentink | ............ | 370/389 |
| 2003/0235197 A1 * | 12/2003 | Wentink | ............ | 370/393 |
| 2005/0063349 A1 * | 3/2005 | LoGalbo et al. | ............ | 370/338 |
| 2005/0099979 A1 * | 5/2005 | Chandra | ............ | 370/338 |
| 2006/0094456 A1 * | 5/2006 | Rittle et al. | ............ | 455/519 |
| 2006/0146768 A1 * | 7/2006 | Bejerano et al. | ............ | 370/338 |
| 2006/0215620 A1 * | 9/2006 | Ou et al. | ............ | 370/338 |

FOREIGN PATENT DOCUMENTS

| | | |
|---|---|---|
| EP | 0 948 166 A1 | 10/1999 |
| EP | 1 427 150 A2 | 6/2004 |
| WO | WO 2005/064823 A1 | 7/2005 |

OTHER PUBLICATIONS

Shin, Sangho et al., "Reducing MAC Layer Handoff Latency in IEEE 802.11 Wireless LANs", *MobiWac '04*, Oct. 1, 2004, Philadelphia, Pennsylvania, USA, Copyright 2004 ACM. 8pgs.

Héctor Velayos and Gunnar Karlsson, "Techniques to Reduce IEEE 802.11b MAC Layer Handover Time", Apr. 2003, Kungl Tekniska Högskolan, TRITA-IMIT-LCN R 03:02, ISSN: 1651-7717, ISRN KTH/IMIT/LCN/R-03/02—SE. 7pgs.

Mishra, Arunesh et al., "An Empirical Analysis of the IEEE 802.11 MAC Layer Handoff Process", 8pgs., Oct. 1, 2004.

* cited by examiner

*Primary Examiner*—Man Phan
(74) *Attorney, Agent, or Firm*—Donald B. Passchburg

(57) ABSTRACT

A data communication system includes an access point and a plurality of stations each for exchanging wireless data communication messages with the access point. At least some of the messages are in a format that includes at least one message header and a plurality of data units. Each of the data units includes a respective data unit header and a respective data frame. Each data unit header identifies a respective one of the stations as a recipient to receive the respective data frame of the data unit.

12 Claims, 12 Drawing Sheets

HIGH-DENSITY WIRELESS LOCAL AREA NETWORK

BACKGROUND

The present invention relates to wireless data communication networks.

Wireless data communication networks are widely used. For example, popular types of wireless local area network (WLAN) are based on the Institute of Electrical and Electronics Engineers (IEEE) 802.11 standard or its variations. Typical applications of 802.11 WLANs include office, enterprise and home data networks.

The 802.11 media access control (MAC) layer protocol uses a Carrier Sense Multiple Access with Collision Avoidance (CSMA/CA) approach to provide random access to the network for all devices while reducing contention that results from overlapping transmissions by more than one device at a time. In CSMA/CA, a device that wishes to transmit a frame listens to the carrier frequency for a fixed interval to make sure the channel is idle, and then starts transmission. When the receiving device receives the frame, the receiving device sends back an acknowledgement frame to the sending device by following the same listen-before-transmission procedure. In addition, in some cases a round of messages consisting of RTS (request to send) and CTS (clear to send) may take place before data is actually exchanged.

The overheads occasioned by the 802.11 protocol are generally not large when the amount of data communicated in each data frame is substantial, as is usually the case in enterprise networks.

It has also been proposed to employ WLANs in industrial control applications to replace wired networks and connect field devices to industrial system controllers. Typically the number of field devices may be large, e.g., in the hundreds, and the typical size of each message may be small, say a frame size of 64 bytes. If the 802.11 protocol were applied without change to such applications, the overhead may be quite high, e.g., in excess of 80%, and it may not be possible to support the desired number of field devices.

SUMMARY OF THE INVENTION

Apparatus and methods are therefore presented for a more efficient wireless data communication network.

According to some embodiments, a data communication system includes an access point and a plurality of stations. Each station is for exchanging wireless data communication messages with the access point. At least some of the messages are in a format that includes at least one message header and a plurality of data units. Each data unit includes a respective data unit header and a respective data frame. Each data unit header identifies a respective one of the stations as a recipient to receive the respective data frame of the data unit.

In another aspect, a data communication system includes an access point and a plurality of stations associated with the access point. Each station is for exchanging wireless data communication messages with the access point. The access point polls the stations. The stations transmit messages to the access point only in response to being polled by the access point. At least some of the messages transmitted by the stations include a respective indication to indicate that the message which includes the indication also includes at least one data unit addressed to a second one of the stations that is different from the station which transmitted the message which includes the indication.

In another aspect, a method of operating an access point is provided. The access point is part of a wireless data communication system that also includes a plurality of field devices that exchange data communication messages with the access point. The method includes the access point maintaining a respective buffer for each of the field devices. Each buffer stores no more than one control data frame for the field device in question. The method further includes the access point receiving a new control data frame appointed for transmission to one of the field devices at a time when the respective buffer for the field device in question stores an old control data frame appointed for transmission to the field device in question. The method further includes the access point responding to receiving the new control data frame by storing the new control data frame in the respective buffer for said one of said field devices in place of the old control data frame.

As used herein and in the appended claims, an "old" control data frame is any data frame that was received prior to a recently arrived control data frame.

In another aspect, a data communication system includes an access point and a plurality of stations. Each station is for exchanging wireless data communication messages with the access point. Each of the stations is operative to detect a timing at which a message is received by the station in question. Each station is further operative to compare the detected timing with a nominal timing for the received message. Each station is further operative to report to the access point a difference between the detected timing and the nominal timing. The access point is operative to adjust a timing of transmission for a next message appointed for transmission to the station in question in response to the difference reported by the station in question.

In another aspect, a method of operating a wireless data communication system is provided. The system includes an access point and a plurality of stations associated with the access point. Each station is for exchanging wireless data communication messages with the access point. The access point polls the stations. The stations transmit messages to the access point only in response to being polled by the access point. The method includes the access point polling each of the stations during a polling cycle. The polling cycle is repeated. During each polling cycle, a respective one of the stations is authorized to include in a poll response a data unit addressed to another station. The data unit is for transmitting to the other station a data frame from a first pre-determined type of data frame. The authorized station is the only station authorized during the polling cycle in question to include in a poll response a data unit addressed to another station that includes a data frame from the first pre-determined type of data frame.

In another aspect, a method of operating a wireless data communication system is provided. The system includes an access point and a plurality of stations associated with the access point. Each station is for exchanging wireless data communication messages with the access point. The access point polls the stations. The stations transmit messages to the access point only in response to being polled by the access point. The method includes a first one of the stations detecting a message transmitted by the access point. The message is addressed to a second one of the stations. The method further includes the first one of the stations determining whether to initiate a handoff process in response to the detection of the message.

In another aspect, a method of operating a wireless data communication system is provided. The system includes a plurality of access points and a plurality of stations associated from time to time with each of said access points, each station for exchanging wireless data communication messages with the respective access point with which said each access point is associated. The method includes one of the stations engaging in a handoff procedure from a first one of said access points to a second one of said access points. The handoff procedure includes the one of the stations transmitting to the second one of the access points a frame sequence number which corresponds to a most recent data frame received by the one of the stations from the first one of the access points.

In another aspect, a method of operating a wireless data communication system is provided. The system includes a plurality of access points and a plurality of stations associated from time to time with each of said access points, each station for exchanging wireless data communication messages with the respective access point with which said each access point is associated. The method includes one of the stations engaging in a handoff procedure from a first one of said access points to a second one of said access points. The method further includes the second one of the access points sending a request message to the first one of the access points to inform the first one of the access points of the handoff procedure. The method further includes the first one of the access points responding to the request message by transmitting to the second one of the access points a frame sequence number which corresponds to a most recent data frame received by the first one of the access points from the one of the stations.

In another aspect, a method of operating a wireless data communication system is provided. The system includes a plurality of access points and a plurality of stations associated from time to time with each of said access points, each station for exchanging wireless data communication messages with the respective access point with which said each access point is associated. The data communication system also includes a controller and a data network coupling the access points to the controller. The method includes one of the stations engaging in a handoff procedure from a first one of said access points to a second one of said access points. The handoff procedure includes the second one of the access points sending a context transfer request to the first one of the access points. The method further includes the first one of the access points responding to the context transfer request by transmitting to the second one of the access points data frames appointed for transmission to the one of the stations. The method further includes the second one of the access points transmitting to the one of the stations the data frames transmitted to the second one of the access points from the first one of the access points. The transmitting of such data frames from the second one of the access points to the one of the stations occurs before the second one of the access points transmits to the one of the stations data frames transmitted to the second one of the access points from the controller via the data network.

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, a wireless data communication system is optimized for use in an industrial application. Among other strategies, messages addressed from an access point (AP) to a data communication station (STA) or from a STA to the AP are loaded with additional data units for receipt by other STAs. The efficiency of the data communication system is improved by these strategies so that the system can support close to real time control and the rather large number of field devices that may be needed in an industrial installation.

Figure 1:
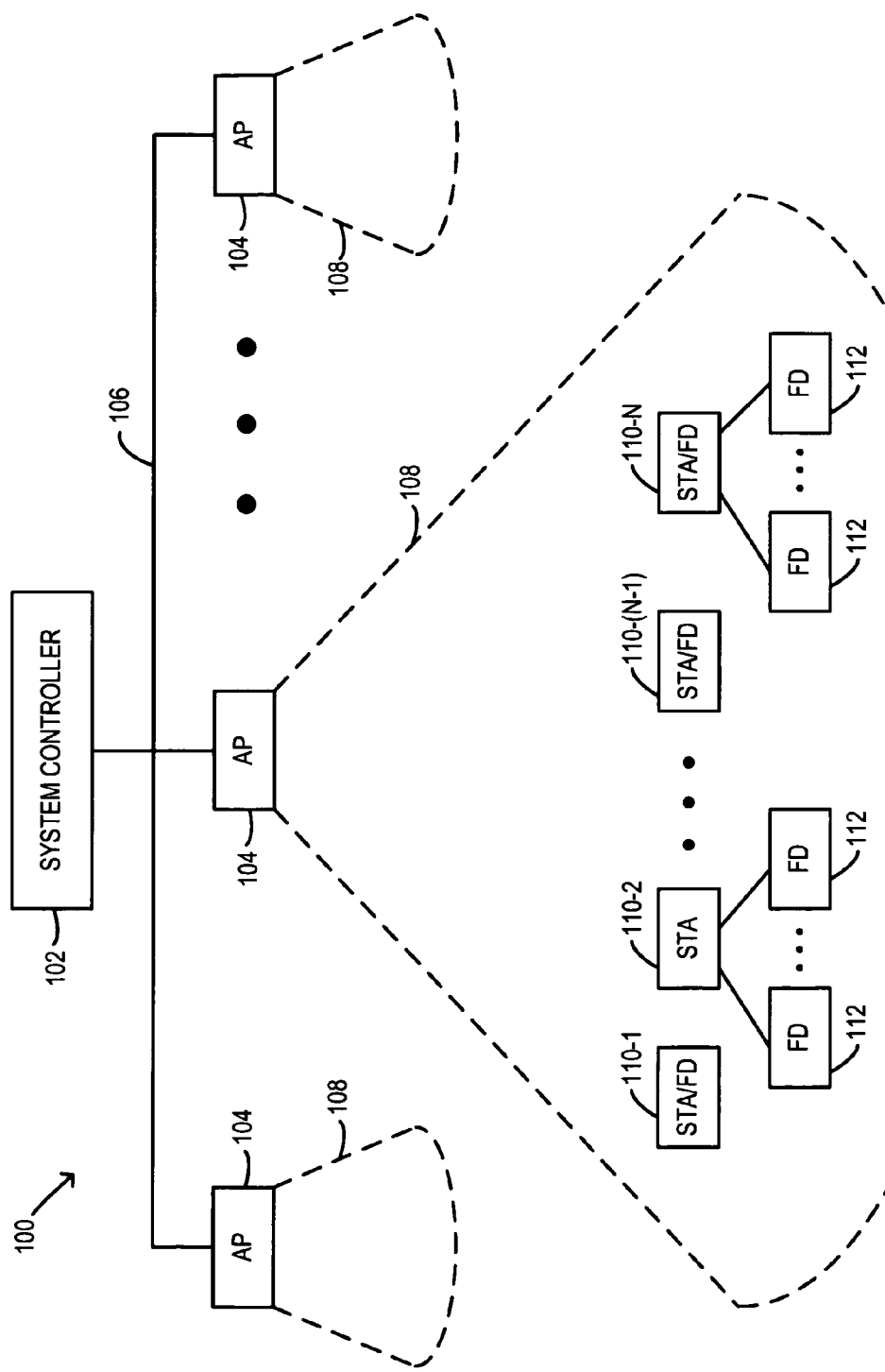
FIG. 1 is a block diagram of a wireless data communication system provided according to some embodiments.

FIG. 1 is a block diagram of a wireless data communication system 100 provided according to some embodiments. The system 100 includes a system controller 102 which is the ultimate source of control messages for controlling the various field devices, discussed below, which make up a factory automation installation. The system controller 102 may also be the ultimate recipient of status and other messages that originate with the field devices. The system controller 102 may be provided in accordance with conventional principles. Although not separately indicated in the drawing, the system controller may include a user interface and/or other input/output devices.

The system controller 102 communicates with the field devices via a number of wireless APs 104. The APs 104 are connected to the system controller 102 by wired/cable data communication signal paths 106. Each AP 104 defines a respective cell 108, which is an area within which STAs 110 are able to exchange wireless data communication messages with the AP 104 for the respective cell. It will be understood that in practice the cells 108 may be partially overlapping with each other to promote complete coverage of a desired area, although the cells are illustrated as non-overlapping in FIG. 1 for convenience of presentation. Within each cell 108 a number of STAs 110 (e.g., 50 to 100) may be located at any given time. In some cases a STA 110 is itself a field device, as indicated at 110-1 and 110-N for example. In addition or alternatively, at least some STAs 110 may be connected by wired data communication paths (as indicated at 110-2, 100-N) to one or more field devices 112. The field devices (whether or not integrated with a STA) may include moving parts and may constitute devices that perform physical movements to implement a manufacturing automation system. To give just one example, one or more of the field devices may be a motorized cart that operates under the control of the system controller 102.

In their hardware aspects, the APs, the STAs and/or the field devices may all be provided in accordance with conventional practices. Some or all of the APs and the STAs may be programmed in accordance with the invention to implement aspects of the invention which are described herein.

Figure 2:
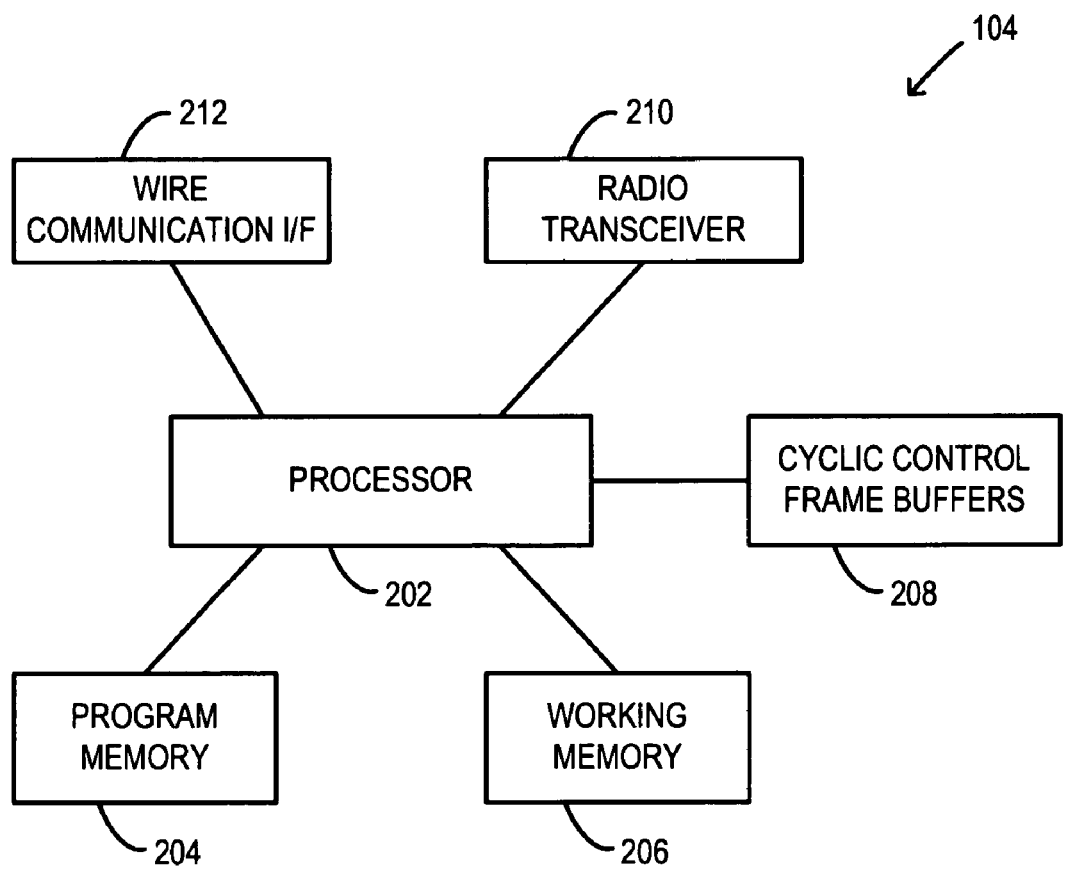
FIG. 2 is a block diagram of a typical access point that is provided according to some embodiments as part of the data communication system of FIG. 1.

FIG. 2 is a block diagram of a typical one of the APs 104.

The AP 104 includes a processor 202 which controls overall operation of the AP 104. The processor 202 may be, for example, a general purpose microprocessor, a digital signal processor (DSP) or other programmable control device. The AP 104 also includes a program memory 204 which is coupled to the processor 202. The program memory 204 may be constituted by one or more devices and stores software and/or firmware program instructions which control the processor 202. The program instructions may include instructions to perform at least some of the functional aspects of the invention as described below.

The AP 104 also includes working memory 206 which is coupled to the processor 202. Further, the AP 104 includes cyclic control frame buffers 208, also coupled to the processor 202, which temporarily store data to be transmitted to field devices associated with the AP 104 and located from time to time in the cell defined by the AP 104.

Although shown as separate functional blocks, two or more of memories 204, 206 and cyclic control frame buffers 208 may be combined in a single device or in two or more shared devices.

The AP 104 further includes a radio transceiver 210 which is coupled to the processor 202 and by which the AP 104 engages in wireless data communication with STAs associated with the AP 104 and located from time to time in the cell defined by the AP 104.

In addition, the AP 104 includes a communication interface 212 which is coupled to the processor 202, and by which the AP exchanges messages with the system controller 102 via a wired signal path 106.

Figure 3:
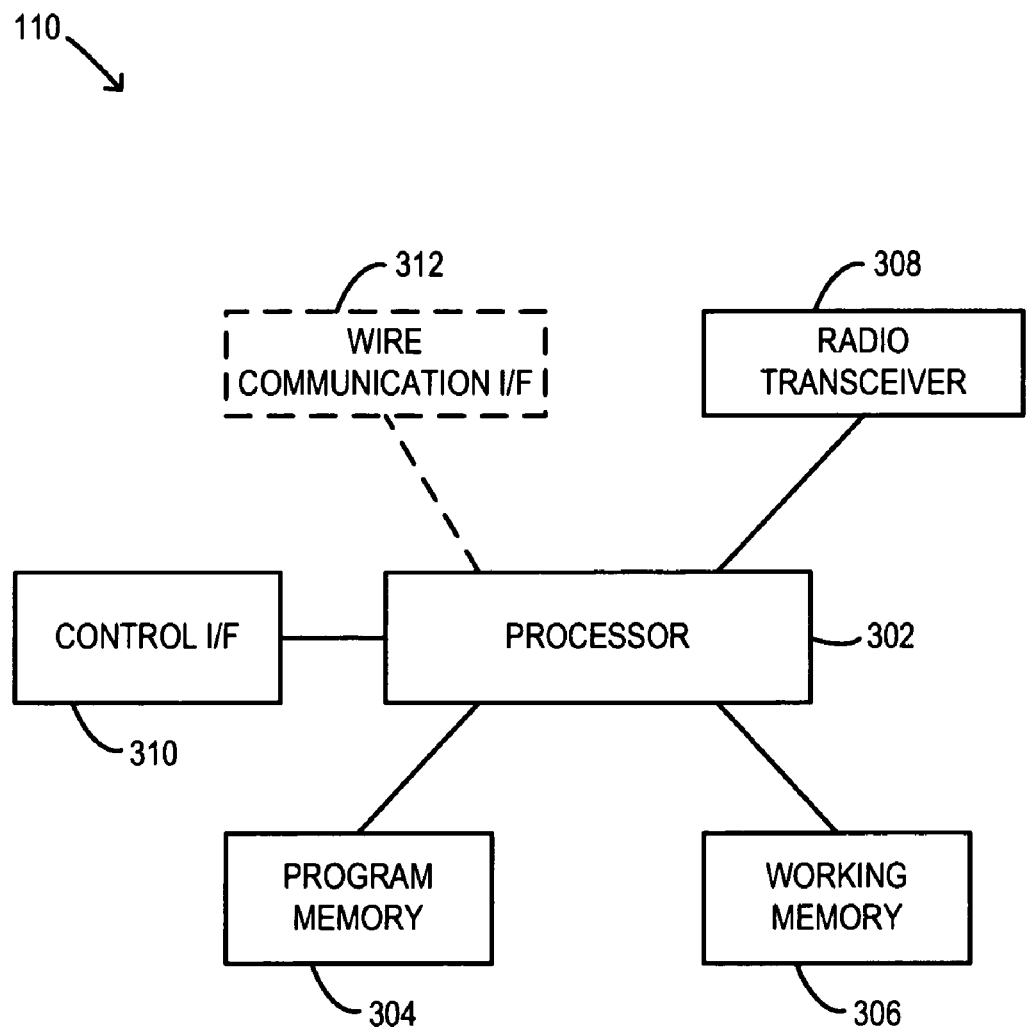
FIG. 3 is a block diagram of a typical wireless data communication station that is provided according to some embodiments as part of the data communication system of FIG. 1.

FIG. 3 is a block diagram of a typical one of the STAs 110. The STA 110 includes a processor 302 which controls overall operation of the STA 110. The processor 302 may be, for example, a general purpose microprocessor, a digital signal processor (DSP) or other programmable control device. The STA 110 also includes a program memory 304 which is coupled to the processor 302. The program memory 304 may be constituted by one or more devices and stores software and/or firmware program instructions which control the processor 302. The program instructions may include instructions to perform at least some of the functional aspects of the invention as described below.

The STA 110 also includes working memory 306 which is coupled to the processor 302. Although shown as separate functional blocks, memories 304, 306 may be combined in a single device or in two or more shared devices.

The STA 110 also includes a radio transceiver 308 which is coupled to the processor 302 and by which the STA 110 engages in wireless data communication with the AP with which STA 110 is associated. In addition, the STA 110 includes a control interface 310 by which the STA 110 may control motors, actuators and/or other physically or electrically operable components of the STA 110 (assuming that the STA is also field device). The control interface is coupled to the processor 302. Further, the STA 110, if it is or may be coupled by wire to a field device, may include a communication interface 312 which is coupled to the processor 302, and by which the STA exchanges messages with one or more field devices.

The software/firmware which controls each AP may include a frame scheduler program module which determines when to transmit data or other messages to each field device associated with the AP in question. The frame scheduler program module may also determine what types of messages to transmit to the field devices. In addition the software/firmware which controls each AP may include a field device protocol program module which interprets message headers of messages received from STAs and which generally hides from the AP's messaging application details of the wireless interface which is implemented between the AP and the STAs.

The software/firmware which controls each STA may include a protocol proxy software module which converts between a standard message format and a special message format employed in accordance with aspects of the present invention.

Figure 4:
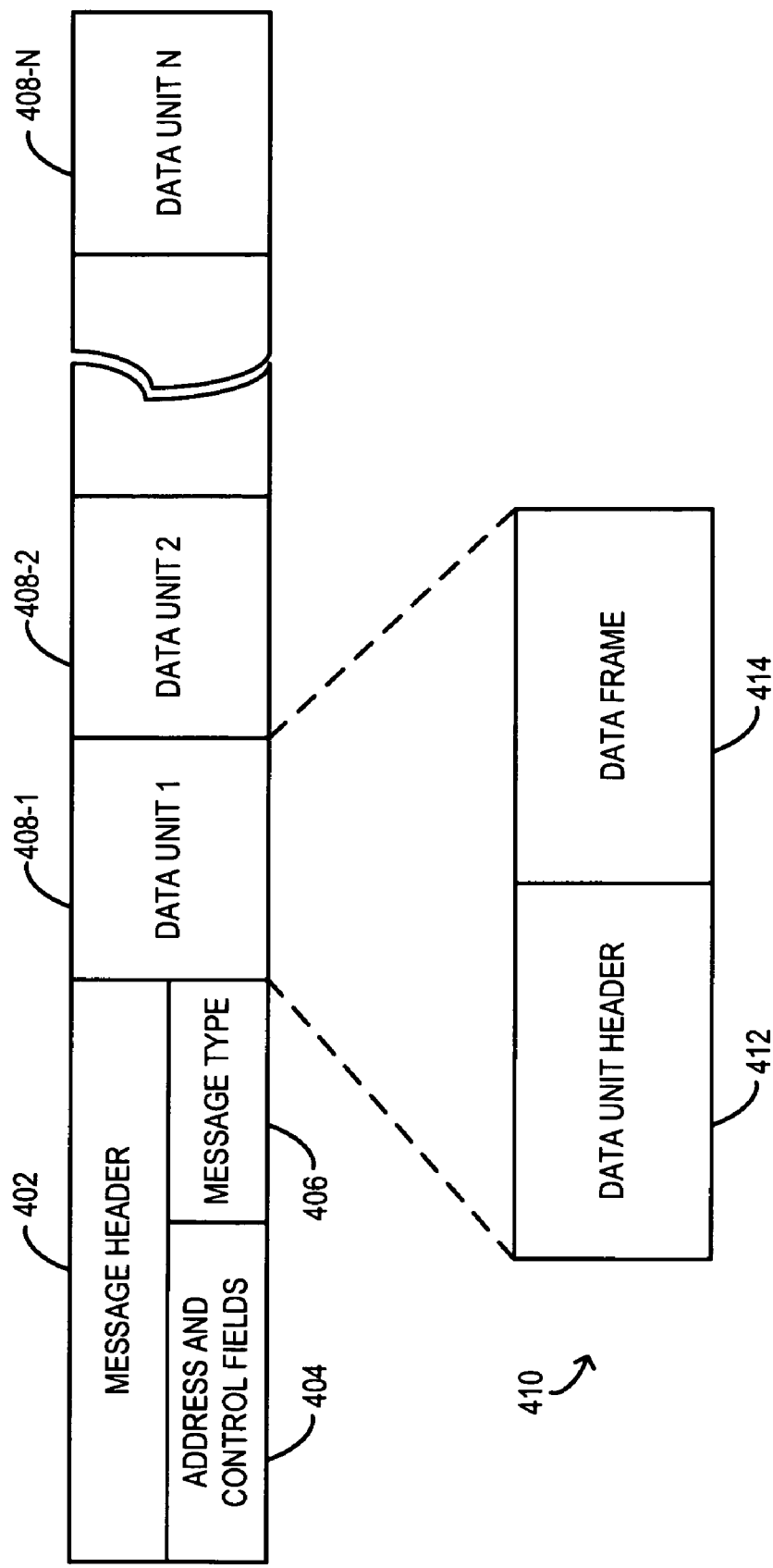
FIG. 4 schematically illustrates a format of a typical data message transmitted in the data communication system of FIG. 1.

FIG. 4 schematically illustrates a format of a typical data message transmitted in accordance with the invention by the APs and/or by the STAs in the communication system 100.

The message format shown in FIG. 4 includes a message header 402. The message header 402 may be a compound header that includes an address and control field section 404 and a message type section 406. The address and control field section 404 may include, when the message is transmitted by an AP, an address that identifies the particular STA to which the message is directed. The address and control fields may generally be in accordance with the type of header data conventionally included in the header of 802.11 messages.

The message type section 406 includes information that indicates the type of the message. For example, a first type indication may indicate that the message is a polling message (if the message is transmitted by an AP) or a response to a polling message (if the message is transmitted by a STA). A second type indication may indicate that the message is an association request (if the message is transmitted by a STA) requesting handoff to a new AP, or a response to an association request (if the message is transmitted by an AP). A third type indication may indicate that the message is a broadcast or multicast message which does not require an acknowledgement. A fourth type indication may indicate that the message is a null data message which may be sent out by the AP from time to time instead of transmitting periodic beacon signals.

The balance of the message format is made up of a sequence of data units 408-1, 408-2, . . . , 408-N. The format of each data unit is illustrated at 410. Each data unit includes a data unit header 412. The data unit header 412 includes the address of the intended recipient (i.e., a STA or the AP) of the data unit and may also include control information for use by the recipient. The data unit also includes a data frame 414 which is the data payload intended for the recipient identified in the data unit header. All of the data units 408 may have the same format illustrated at 410, but the respective data unit headers may each specify mutually different recipients, so that the respective data frames of the data units are effectively addressed to different recipients. The first data unit may be intended for the same recipient addressed in the address and control field 404 of the message header 402 and, accordingly, the data unit header of the first data unit may identify the same recipient as the message header. A message need not have more than one data unit.

In accordance with some aspects of the invention, the AP may poll each STA associated with it in turn during a polling cycle, and the polling cycle may be repeated. The STAs may operate so as to send messages to the AP only in response to a polling message sent by the AP and addressed to the STA in question. However, each polling message transmitted by the AP may include additional data units addressed to other STAs to which the polling message itself is not addressed, and all STAs may listen to all polling messages, whether or not addressed to the STA in question, and if the polling message includes a data unit addressed to a STA which is not the target of the polling message, the STA which is not the target may still receive and read the data unit that is addressed to it.

Similarly, when a STA transmits a response to a polling message, the response message may include one or more data units addressed to other STAs. In such cases, the header of the response message may include an indication (e.g., a flag) to indicate that the response message includes at least one data unit addressed to another STA. All STAs may listen to all response messages transmitted by other STAs and, when the indication is present in the header, may pick up data units addressed to them in the response messages transmitted by other STAs.

In accordance with a messaging scheme provided by the invention, every message addressed to a STA must be acknowledged, but acknowledgements may be transmitted by the STAs only in response to being polled by the AP.

It may be desirable for transmission of a data frame to be repeated until acknowledgement is received that the transmission was successful or until a maximum number of retries has occurred. However, repeated transmission may result in duplicate frames being received by the recipient in the event that acknowledgements are lost. To prevent confusion from receipt of duplicate data frames, a frame sequence numbering scheme may be employed. Each transmitting device may generate a frame number sequence for each recipient by data message class. Each data unit 408 may include a resulting frame sequence number (e.g., in the data unit header 412). In addition, in some embodiments, a frame sequence number may also be included in the message header 402. In some embodiments the message header 402 may include a message sequence number.

The recipient device may drop data frames having frame sequence numbers that duplicate (or are prior in sequence to) previously received frame sequence numbers.

Figure 5:
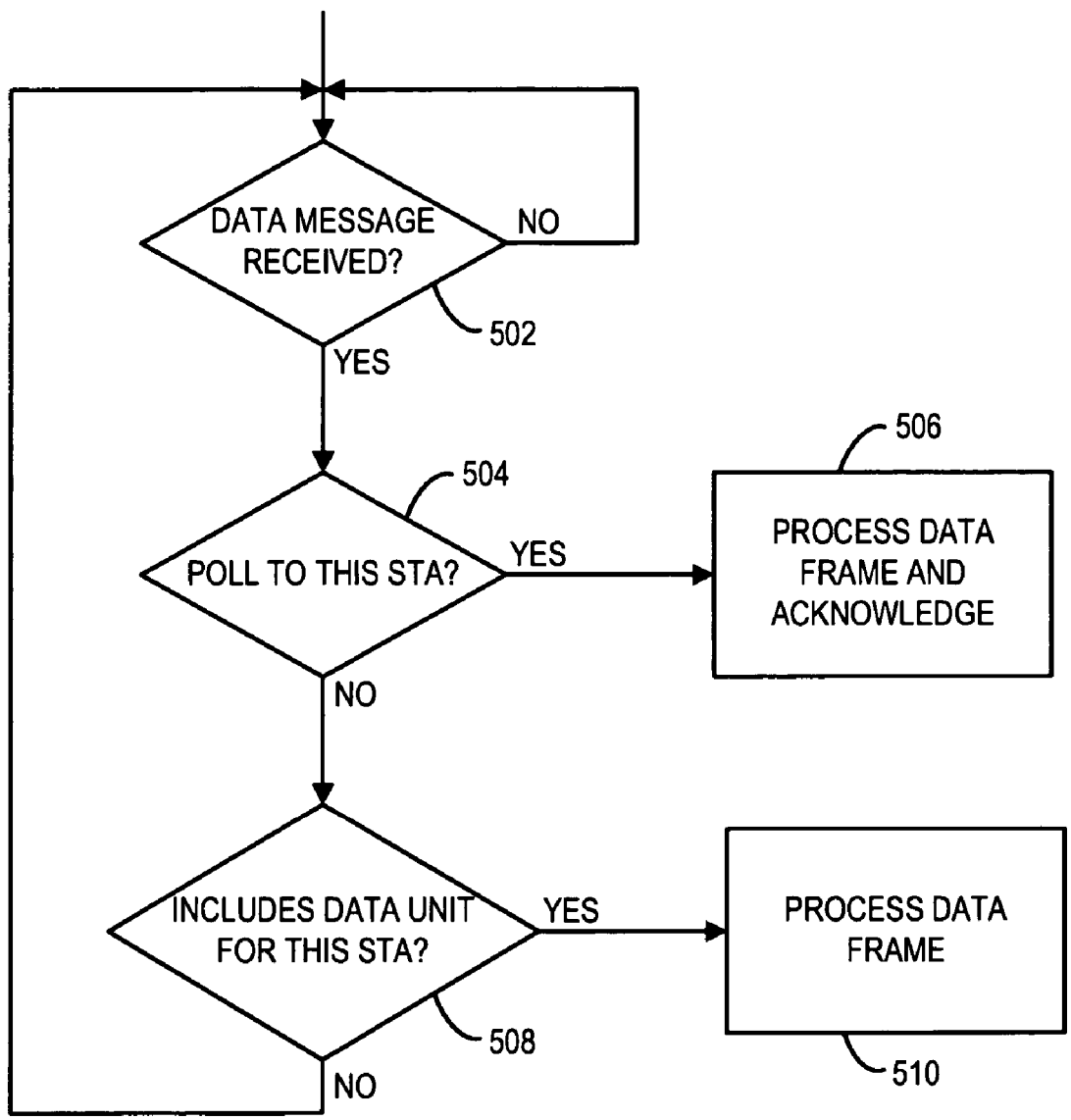
FIG. 5 is a flow chart that illustrates a process performed according to an aspect of the invention in the data communication station of FIG. 3.

FIG. 5 is a flow chart that illustrates a process performed by a typical one of the STAs. At 502 in FIG. 5, it is determined whether a message is received by the STA. At 504, it is determined whether the message that was received is a polling message addressed to the STA. If so, then, as indicated at 506, the STA reads the data frame included in the data unit addressed to the STA and takes whatever action is required by the data frame. In addition, the STA transmits a response which is an acknowledgement of the polling message. The action to be taken by the STA may not be completed until after the response is transmitted.

If at 504 it is determined that the message is not a polling message addressed to the STA, the STA next determines at 508 whether the message includes a data unit that is addressed to the STA. If so, then, as indicated at 510, the STA reads the data frame included in the data frame addressed to the STA and takes whatever action is required by the data frame, but does not at this time transmit an acknowledgement of the data frame. Rather, the STA will wait to acknowledge the data frame until the STA is polled by the AP. The polling message to the STA may repeat the data unit that was originally picked up by the STA from a polling message that was addressed to another STA or from a message transmitted by another STA.

With this approach, additional payload may be included in at least some messages, thereby effectively lowering the overhead burden. Further, by letting STAs receive data units prior to the time when the STAs are polled, the STAs may be given enough time to take action and generate response data before the STAs are polled. As a result, the responses of the STAs to polling messages may include new data and may accelerate effective back-and-forth interactions between the field devices and the system controller. This approach may be particularly suitable for an industrial control application, in which frequent, brief control and status messages are to be exchanged. Also, this approach may increase the number of STAs/field devices that may be effectively served by a single AP.

Figure 6:
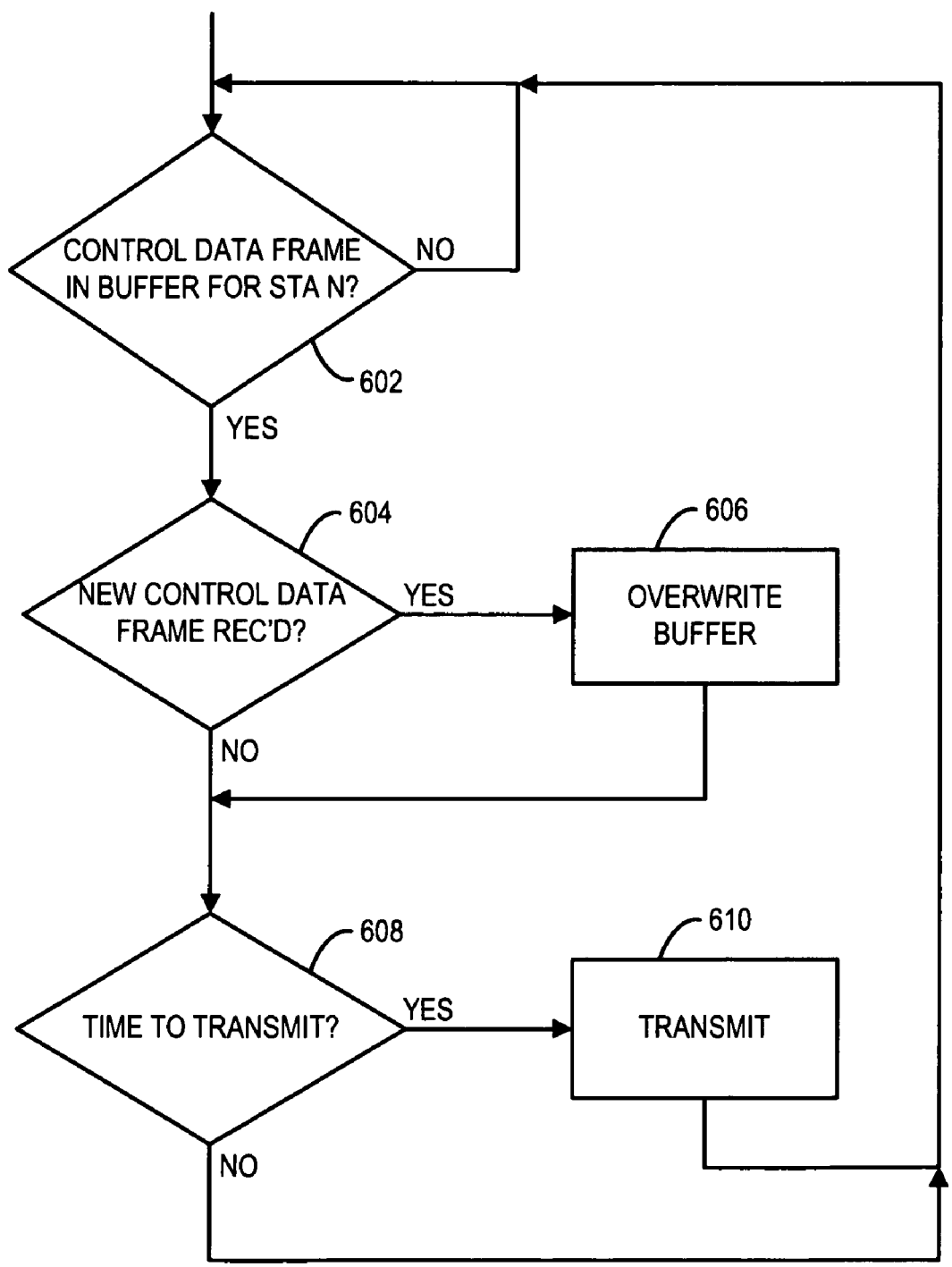
FIG. 6 is a flow chart that illustrates a process performed according to an aspect of the invention in the access point of FIG. 2.

FIG. 6 is a flow chart that illustrates a process performed by at least one of the APs in accordance with another aspect of the invention. The process of FIG. 6 may further enhance the efficiency of the communication system 100. In connection with the process of FIG. 6, it will be noted that each AP maintains a respective buffer for each STA and/or field device associated with the AP in question. Each buffer is sized to store no more than one control data frame that is received by the AP from the system controller 102 and appointed for transmission to the field device/STA that corresponds to the buffer in question.

At 602 in FIG. 6, it is determined whether a control data frame is currently stored in the buffer for a particular STA/field device. If so, the AP determines (604) whether a new control frame for the particular STA/field device is received by the AP from the system controller. In the event that the AP receives a new control data frame for the STA/field device at a time when the buffer for the STA/field device already stores an old control data frame that has not yet been transmitted by the AP to the STA/field device, then, as indicated at 606, the AP responds to receiving the new data frame by overwriting the buffer; i.e., by storing the new control data frame in the buffer in place of the old control data frame.

As indicated at 608, the AP determines whether the time for sending the control data frame to the STA/field device has come up in the polling cycle. If so, the control data frame currently held in the buffer is transmitted to the STA/field device, as indicated at 610.

The process of FIG. 6 favors the control data frames most recently received at the APs from the system controller, and thus reduces the control data traffic while sending to the field devices the control data frames that are most likely to be relevant to current conditions. As a result, the response time and efficiency of the data communication system may be enhanced. Although the process of FIG. 6 is illustrated via a flow chart, in practice it may be desirable to implement the process with a finite state machine.

In operation of an industrial automation system, it may be desirable for the field devices/STAs to receive control signals from the system controller at regular intervals. However, a polling arrangement such as that described above may tend to introduce variability in the timing at which control signals are sent to each field device/STA. The processes described below in connection with FIGS. 7 and 8 may tend to mitigate variations in timing of delivery of control signals.

Figure 7:
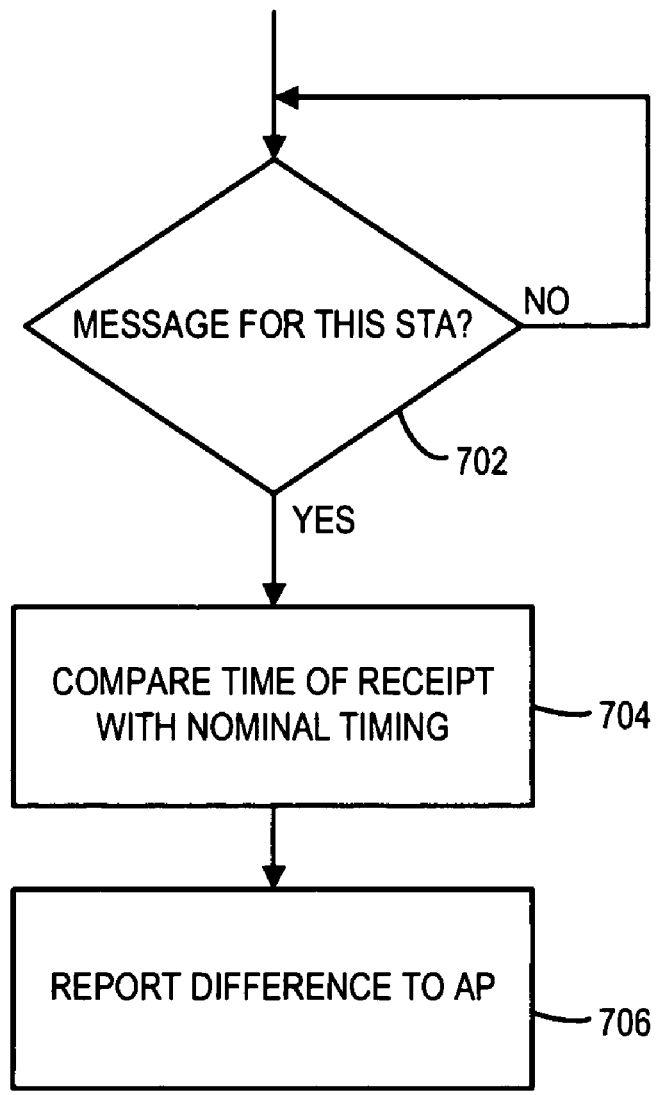
FIG. 7 is a flow chart that illustrates a process performed according to an aspect of the invention in the data communication station of FIG. 3.

FIG. 7 is a flow chart that illustrates a process that may be performed in at least some of the STAs. In regard to the process of FIG. 7 it will be noted that each STA may be provided with a clock capability to allow the STA to monitor a nominal timing at which control data frames should be received at the STA to comport with regular intervals for receipt of the control data frames.

At 702 in FIG. 2, the STA determines whether a message which the STA has received is addressed to the STA (i.e., the STA may detect that the message header contains the address of the STA). If so, the STA detects the timing of the message and, as indicated at 704, compares that timing with the nominal control data frame timing which the STA has been tracking. The STA calculates the difference in timing, if any, between the nominal timing and the actual timing of receipt of the message, and then in its response to the message, the STA reports the difference in timing to the AP, as indicated at 706.

Figure 8:
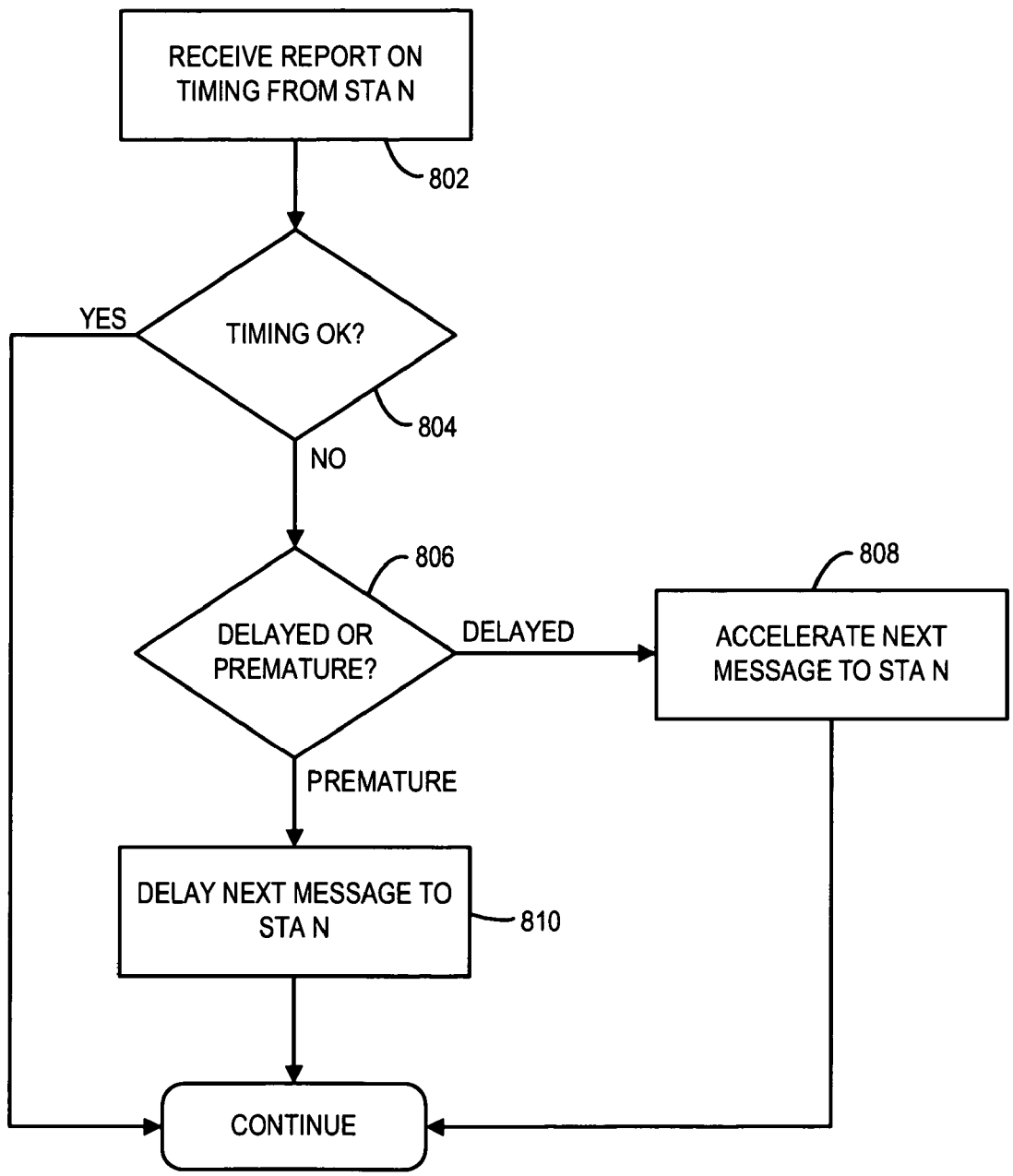
FIG. 8 is a flow chart that illustrates a process performed according to an aspect of the invention in the access point of FIG. 2.

FIG. 8 is a flow chart that illustrates a process that may be performed in at least some of the APs.

At 802, the AP receives from a STA the report (referred to at 706 in FIG. 7) concerning the difference detected by the STA between the actual timing of receipt of the last control data frame and the nominal timing. At 804 the AP determines whether the difference in timing is within an acceptable window. If not, the AP operates to adjust the timing of transmission to the STA of the next control data frame for the STA. Thus, as indicated at 806, the AP determines whether the reported difference indicates that the last control data frame transmitted to the STA was delayed relative to the nominal timing or was premature relative to the nominal timing. If the last control data frame was delayed relative to the nominal timing, the AP may accelerate the timing of transmission of the next control data frame to the STA in question, as indicated at 808. For example, this may be done by advancing the STA's turn in the polling cycle.

If the last control data frame was premature relative to the nominal timing, the AP may delay the timing of transmission of the next control data frame to the STA in question, as indicated at 810. For example, the turn of the STA in the polling cycle may be retarded relative to other STAs.

In case of either accelerating or delaying the timing of transmission of the next control data frame, the degree of acceleration or delay may be proportional to the difference reported by the STA.

In some embodiments, all STAs may be privileged to include data units for other STAs in poll response messages whenever the STAs have relatively high priority message traffic to transmit. Examples of such high priority traffic may include cyclic communications and alarm messages. However, to maintain timeliness of the polling cycle, the privilege of the STAs to piggyback low priority traffic on poll response messages may be restricted. Examples of low priority traffic may include acyclic communications (such as configuration requests/commands) and TCP/IP traffic. Suitable restrictions on low priority traffic, with fairness among the STAs, may be implemented as described below in connection with the processes illustrated in FIGS. 9 and 10.

Figure 9:
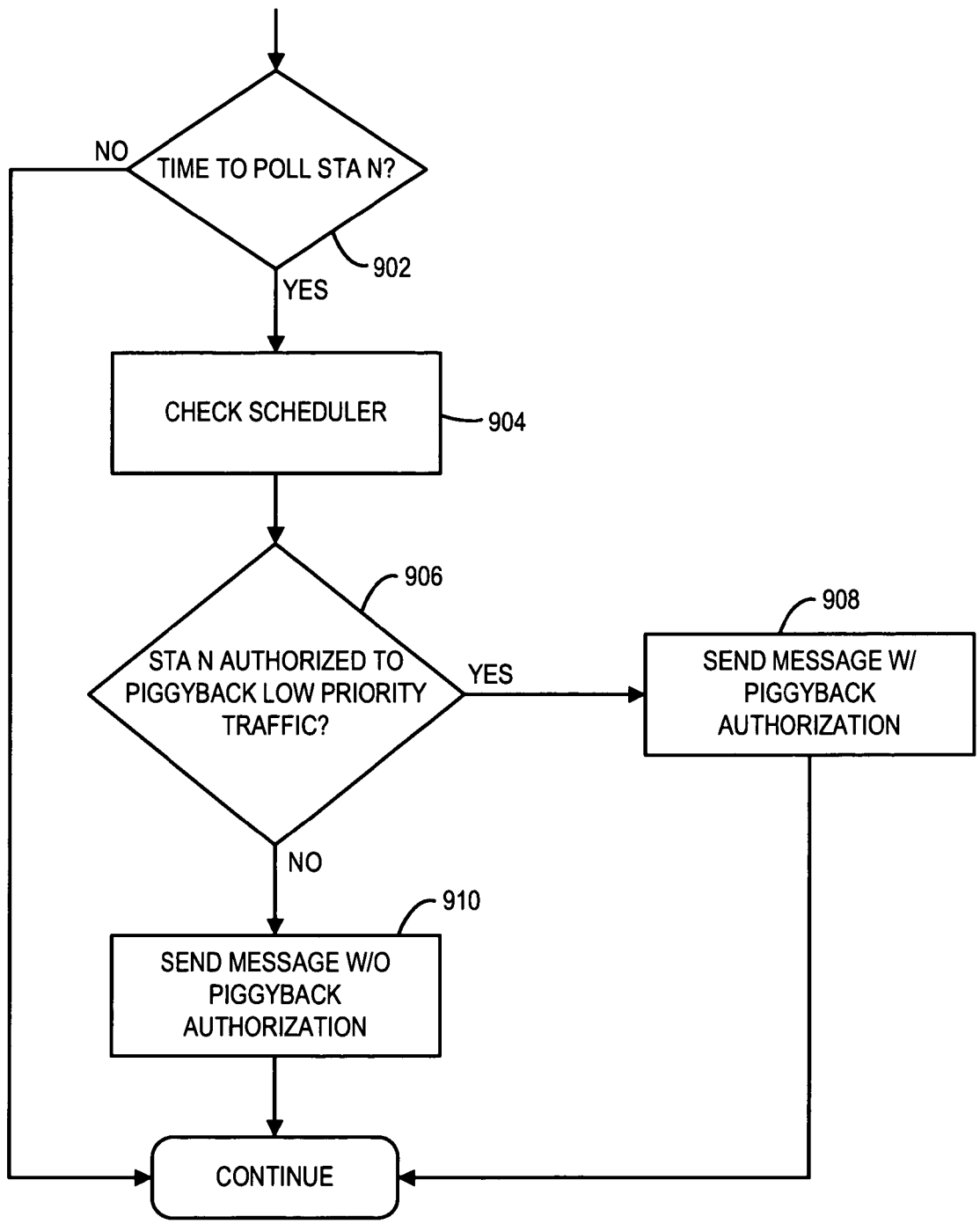
FIG. 9 is a flow chart that illustrates a process performed according to an aspect of the invention in the access point of FIG. 2.

FIG. 9 is a flow chart that illustrates a process that may be performed by at least some of the APs. In regard to the process of FIG. 9, each AP may maintain a round robin scheduler which, for each polling cycle, identifies a particular STA that is privileged to piggyback low priority traffic in the polling cycle. As the polling cycles occur, the scheduler may in turn indicate each STA in one of the polling cycles until all STAs have been given the piggyback privilege. The piggyback privilege cycle of polling cycles may then be repeated.

At 902 in FIG. 9, the AP determines whether it is time to poll a particular STA in the current polling cycle. If so, then the AP checks the round robin scheduler (as indicated at 904) to determine (as indicated at 906) whether the STA that is now to be polled holds the low priority piggyback privilege for the current polling cycle. If so, the polling message sent by the AP to the STA indicates to the STA that it is authorized to piggyback low priority traffic in its poll response, as indicated at 908. If a negative determination is made at 906, then the poll message to the STA does not indicate that the STA is authorized to piggyback low priority traffic in its poll response, as indicated at 910.

Figure 10:
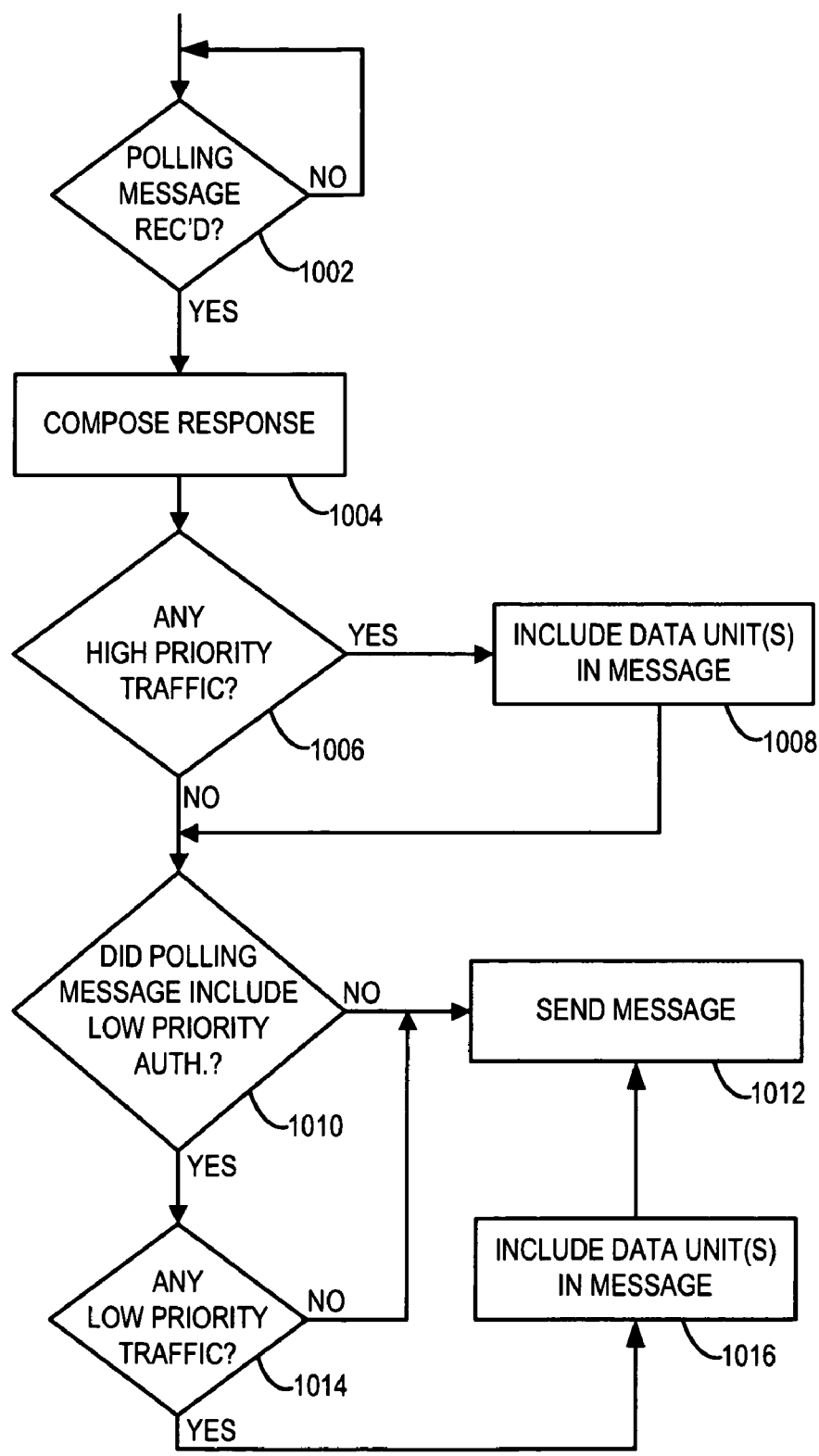
FIG. 10 is a flow chart that illustrates a process performed according to an aspect of the invention in the data communication station of FIG. 3.

FIG. 10 is a flow chart that illustrates a process that may be performed by at least some of the STAs. At 1002, the STA determines whether it has received a polling message directed to the STA. If so, then, as indicated at 1004, the STA composes a suitable response message, including, for example, a data unit containing a data frame to be forwarded by the AP to the system controller.

At 1006, the STA determines whether it has any high priority traffic to piggyback on the response message. If so, as indicated at 1008, the STA adds one or more data units to the response message to incorporate the high-priority traffic to be piggybacked on the message. Then, at 1010, the STA determines whether the polling message to the STA indicated that the STA was authorized to piggyback low priority traffic. If not, then, as indicated at 1012, the STA transmits the response message composed at 1004, including any data units appended at 1008.

If a positive determination is made at 1010 (i.e., if the STA was authorized to piggyback low priority traffic), then the STA determines at 1014 whether it has any low priority traffic to send. If not, the process proceeds to 1012, and the STA transmits the response message, with any data units appended at 1008. If a positive determination is made at 1014 (i.e., if the STA determines that it has low priority traffic to send), the STA adds one or more data units to the response message to incorporate the low priority traffic to be piggybacked on the message, as indicated at 1016. The process then proceeds to 1012 at which the STA transmits the response message with the data units appended at 1016 and with any data units appended at 1008.

In some embodiments, the poll/response approach described above for controlling traffic between the APs and the STAs may coexist with conventional CSMA/CA messaging, so that 802.11 devices brought into a cell may communicate in a conventional manner with the AP in question. If a message sent by such a conventional 802.11 device collides with a message to or from one of the polled STAs, the AP detects the collision and initiates re-sending of the round of messages that was subject to the collision.

In some embodiments, as long as there is traffic to be sent to the polled STAs, the rounds of polling message/response may be repeated at intervals of about 1 millisecond. During periods when there is no traffic to the STAs associated with a particular AP, the AP in question may transmit null data messages at intervals of about 5 milliseconds. With either polling messages or null data messages being transmitted by the APs at such relatively short intervals, it may be acceptable to omit transmission by the AP of beacon signals that are customarily used to allow STAs to detect departure from a cell and/or arrival in a new cell. With APs transmitting messages at such short intervals, handoff of a moving STA from one AP to another may occur quite promptly.

Other aspects of the operation of the communication system 100 with respect to handoff of STAs from one AP to another may also be optimized. For example, in some embodiments, the total number of frequencies/frequency channels that are used is limited to three, which is the minimum number needed for a cellular wireless communication system. By limiting the number of frequency targets to be scanned by the STAs, the time required for handoff may be minimized. By the same token, the handoff procedures used in the communication system 100 may call for "background scanning" by the STAs, i.e., scanning for other APs even while satisfactory contact continues with the AP with which the STA in question is currently associated. Moreover, the process of scanning may take into account polling messages addressed by APs to a STA other than the STA that is performing the scanning.

Figure 11:
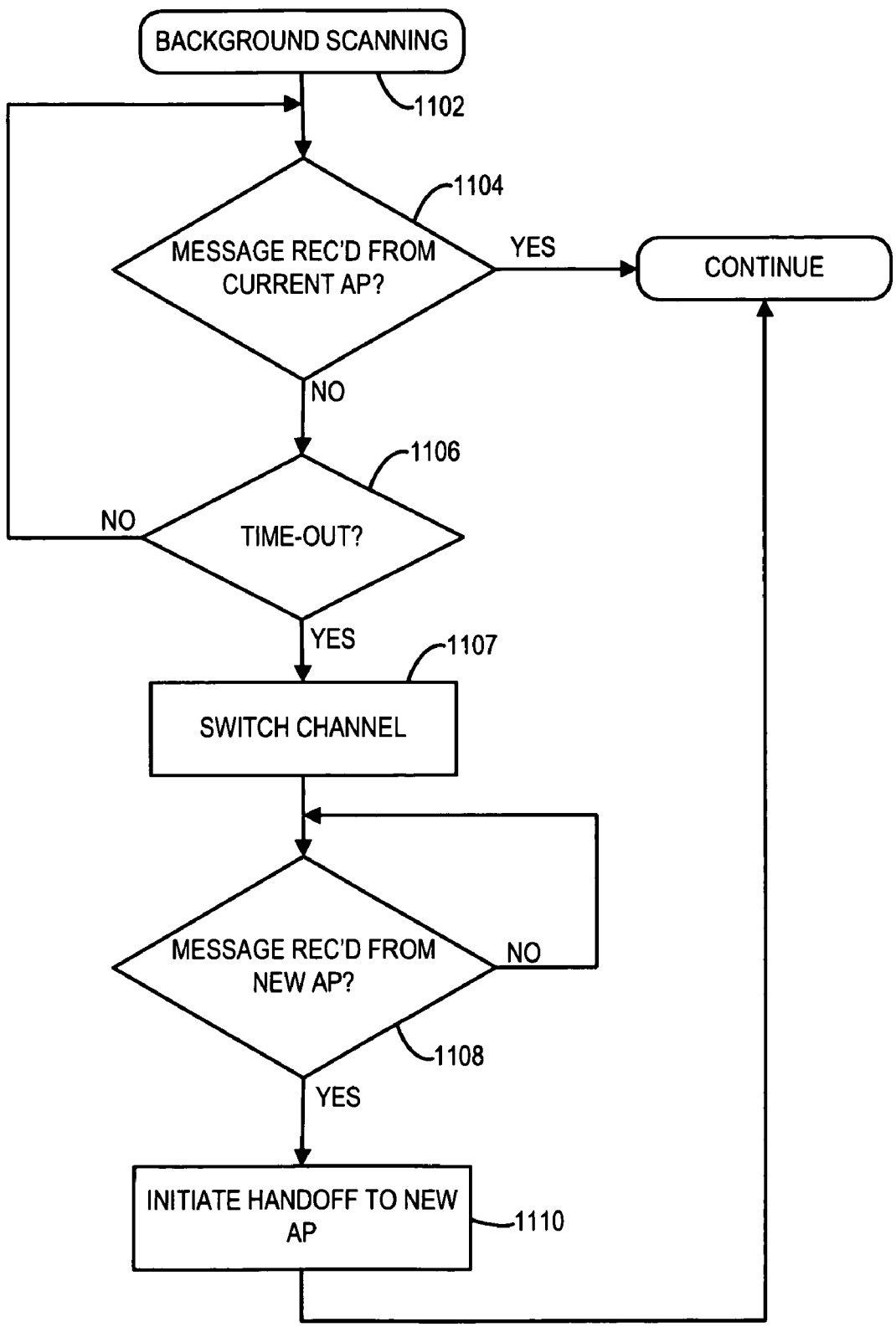
FIG. 11 is a flow chart that illustrates a process performed according to an aspect of the invention in the data communication station of FIG. 3.

FIG. 11 is a flow chart that illustrates a process that may be performed in this regard by at least some of the STAs. Block 1102 in FIG. 11 indicates that the STA is engaged in background scanning for the purpose of determining whether to initiate a handoff procedure. At 1104 the STA determines whether it has received a message transmitted from the AP with which the STA is currently associated. The message may be a polling message addressed either to the STA or to another STA. The message need not include a data unit addressed to the STA which is performing the scanning. Any polling message from the AP, whether or not addressed to the STA in question, will reset the handoff timer if received by the STA in question. If no polling message is received from the AP with which the STA is associated, the STA determines, as indicated at 1106, whether the handoff timer has timed out. As long as polling or other messages from the AP continue to be received before the handoff timer times out, the STA does not initiate a handoff. But if the handoff timer times out, the STA switches communication channels (as indicated at 1107), then the STA determines, as indicated at 1108, whether it has received a message transmitted by another AP. The message may be a polling message addressed to another STA. If the STA receives a message transmitted by another AP, then the STA may initiate handoff to the other AP, as indicated at 1110.

Thus the STA may determine not to initiate the handoff procedure in response to receiving from the AP with which it is associated a polling message addressed to another STA. Also, the STA may determine to initiate the handoff procedure in response to receiving from a new AP a polling message addressed to another STA. The handoff procedure may entail the STA sending an association request to the new AP as well as other conventional steps. When the STA has become associated with a new AP, the new AP may send a message to the old AP to let the old AP know that it need not service the STA any more. To further speed up handoffs, the STAs may engage in "learning" activities in which the STAs track their progress through a sequence of cells and detect patterns in their own movements to more rapidly select a new AP when handoff is necessary.

Instead of background scanning, scanning for a new AP may be initiated in response to events such as a reduction in signal strength, failure to receive a polling message within a certain period of time, or failure to receive an acknowledgement to a sent packet.

By limiting access to the system physical plant to certain authorized STAs, streamlined association protocols may be introduced, thereby further speeding up handoff latency.

One issue that should be addressed in connection with a handoff procedure is how to prevent data frames from getting lost due to, e.g., frames being buffered at the old AP and never transmitted to the STA. Lost data frames upon handoff is a common occurrence in conventional wireless data communication systems.

Figure 12:
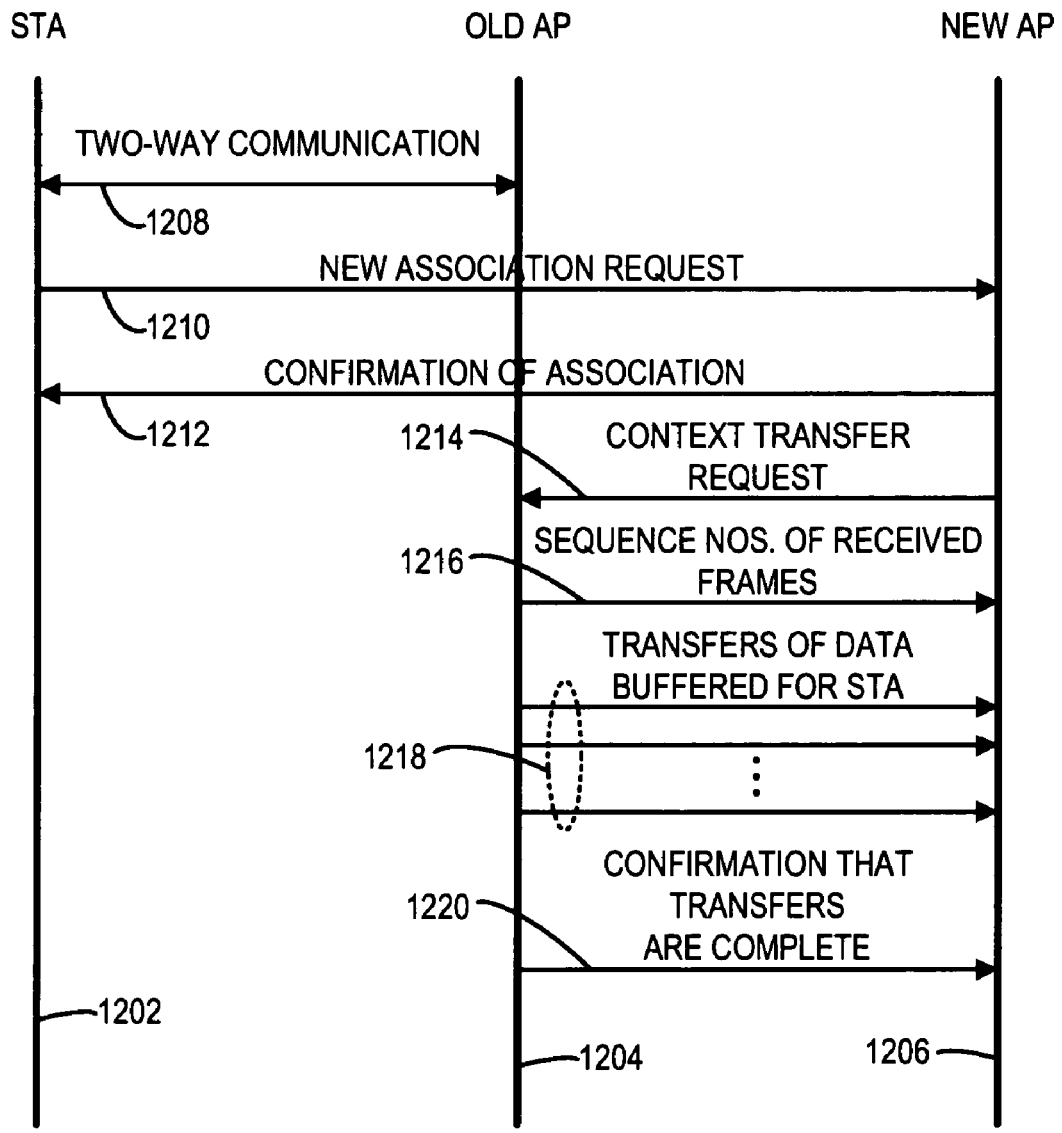
FIG. 12 is a sequence diagram that illustrates a process performed according to an aspect of the invention in the data communication station of FIG. 3.

FIG. 12 is a sequence diagram that illustrates a handoff/context transfer procedure that addresses this issue. Aspects of the procedure also address issues such as preventing confusion due to frame duplication, dealing with a failure of context transfer, and correctly sequencing frames bound from the system controller 102 to the STA.

In FIG. 12, arrows that emerge from left-hand vertical line 1202 represent messages transmitted from the STA which undergoes the handoff procedure; arrows that emerge from middle vertical line 1204 represent messages transmitted from the old AP; and arrows that emerge from the right-hand vertical line 1206 represent messages transmitted from the new AP.

Double headed arrow 1208 represents a normal sequence of communication between the STA and the old AP. As is conventional, the handoff of the STA from the old AP to the new AP may be prompted by the STA being moved (or moving itself) out of the cell defined by the old AP to a location within the cell defined by the new AP. Upon detecting that communication with the old AP is no longer possible, and detecting a message (e.g., a message directed to another STA) originating from the new AP, the STA transmits an association request 1210 to the new AP. The association request may include frame sequence numbers, for each class (or queue) of messages that correspond to the last data frames received by the STA from the old AP. The association request may also include information (e.g., an address) that identifies the old AP.

The new AP then transmits to the STA a message 1212 which confirms the association of the STA with the new AP. For the time being, until the context transfer at least partially occurs, the new AP may prevent the STA from transmitting acyclic messages, and may buffer messages received from the system controller for relay to the STA. Once the STA is allowed to resume transmission, it may restart at zero all of the frame sequence numbering for data frames that it transmits.

At 1214, the new AP sends a context transfer request to the old AP. The context transfer request includes the frame sequence numbers that were transmitted by the STA to the new AP at 1210 (i.e., the frame sequence numbers corresponding to the last data frames received by the STA from the old AP). The old AP responds to the context transfer request by transmitting (as indicated at 1216) to the new AP the frame sequence numbers that correspond to the last data frames received by the old AP from the STA.

The messages indicated at 1218 represent transfers from the old AP to the new AP of buffered data frames to be sent to the STA. Before transferring these data frames, the old AP discards any data frames having frame sequence numbers that match or antedate the frame sequence numbers sent from the new AP to the old AP at 1214 (which were the frame sequence numbers sent from the STA to the new AP at 1210).

Once all the buffered (and not discarded) data frames have been transferred from the old AP to the new AP, the old AP sends a message 1220 to the new AP confirming that the transfers are complete.

Because the STA has informed the new AP of the frame sequence numbers of the latest data frames received by the STA from the old AP, the new AP can avoid sending duplicate data frames to the STA. In fact, such data frames may at least part of the time be suppressed by the old AP from the data frames transferred from the old AP to the new AP.

Once the new AP receives from the old AP the frame sequence numbers of the latest data frames received by the old AP from the STA, the new AP can re-enable data frame transmissions from the STA because the new AP can now detect and discard duplicate data frames. It should be understood that cyclic communications from the STA may not be subject to inhibition by the new AP pending receipt of the frame sequence numbers from the old AP.

The new AP queues up new data frames for the STA received from the system controller to be transmitted after the new AP transmits to the STA the data frames transferred from the old AP.

In a case where the context transfer fails (e.g. because the new AP cannot contact the old AP), the new AP can still accept data frames transmitted from the STA that the STA had never previously transmitted and for which the sequence numbering has been restarted from zero. Since the sequence numbering has been restarted, the new AP is able to synchronize with the STA. However, if the context transfer fails, it is advisable for the new AP to disregard any data frame from the STA which has its "retry-bit" set.

In some embodiments all or fewer than all of the features described herein may be incorporated in a single system.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A data communication system comprising:
   an access point; and
   a plurality of stations each for receiving polling messages transmitted from the access point and for transmitting response messages to the access point, said polling messages and said response messages being wireless data communication messages;
   wherein at least some of said polling messages are in a format that includes at least one message header and a plurality of data units, each of said data units including a respective data unit header and a respective data frame, each data unit header identifying a respective one of the stations as a recipient station to receive the respective data frame of the data unit, and wherein said message header in said format of said at least some polling messages identifies the same recipient station that is identified by the respective data unit header of a first one of said data units; and wherein the access point polls the stations and the stations transmit response messages to the access point only in response to being polled by the access point;
   wherein:
   the recipient station identified by the respective data unit header included in the first one of said data units of one of said polling messages that is sent by the access point receives said one of said polling messages and acknowledges receipt of the respective data frame included in said first one of the data units, said recipient station identified by the respective data unit header in the first one of said data units and also being identified by the message header of said one of said polling messages; and
   a second recipient station identified by the respective data unit header included in a second one of said data units in said one of said polling messages receives said one of said polling messages that was sent by the access point and received by said recipient station identified by the respective data unit header included in the first one of said data units, said one of said polling messages including said message header that identifies the recipient station identified by the respective data unit header included in the first one of said data units of said one of said polling messages, and the second recipient station reads said second one of said data units but does not acknowledge receipt of the respective data frame included in said second one of the data units until said second recipient station is polled by a polling message transmitted by said access point and including a message header that identifies said second recipient.

2. A data communication system according to claim 1, wherein said plurality of stations includes at least 50 stations.

3. A data communication system according to claim 1, wherein each said data unit includes a respective frame sequence number.

4. A data communication system according to claim 3, wherein said respective frame sequence number is included in the respective data unit header of said each data unit.

5. A data communication system according to claim 3, wherein said message header includes a message sequence number.

6. A data communication system comprising:
   an access point; and
   a plurality of stations associated with said access point, each for exchanging wireless data communication messages with said access point, said access point polling said stations, said stations transmitting messages to the access point only in response to being polled by said access point;
   wherein one of said stations is programmed to respond to a polling message addressed to said one of said stations by transmitting a response message addressed to said access point, said response message including (a) a data unit addressed to a second station that is different from said one of said stations, and (b) an indication that the response message includes said data unit addressed to said second station;
   wherein said second station detects the indication and receives the data unit addressed to said second station without waiting for the data unit to be transmitted by the access point.

7. A data communication system according to claim 6, wherein said plurality of stations includes at least 50 stations.

8. A data communication system according to claim 1, wherein at least some of the stations are components of a manufacturing automation system.

9. A data communication system according to claim 1, wherein the message header conforms to a standard known as 802.11.

10. A data communication system according to claim 1, wherein the respective data frame has a size equal to 64 bytes.

11. A data communication system according to claim 6, wherein at least some of the stations are components of a manufacturing automation system.

12. A data communication system according to claim 6, wherein the data unit includes a data frame, and said data frame has a size equal to 64 bytes.

* * * * *